United States Patent
Schwalenberg

(10) Patent No.: US 10,502,392 B2
(45) Date of Patent: Dec. 10, 2019

(54) ILLUMINATION DEVICE

(71) Applicant: OSRAM GmbH, Munich (DE)

(72) Inventor: Simon Schwalenberg, Brennberg (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/752,903

(22) PCT Filed: Jul. 1, 2016

(86) PCT No.: PCT/EP2016/065609
§ 371 (c)(1),
(2) Date: Feb. 15, 2018

(87) PCT Pub. No.: WO2017/032493
PCT Pub. Date: Mar. 2, 2017

(65) Prior Publication Data
US 2018/0231209 A1    Aug. 16, 2018

(30) Foreign Application Priority Data

Aug. 24, 2015    (DE) .................. 10 2015 216 111

(51) Int. Cl.
*F21V 5/04*    (2006.01)
*F21V 13/04*    (2006.01)
(Continued)

(52) U.S. Cl.
CPC .............. *F21V 5/045* (2013.01); *F21V 5/008* (2013.01); *F21V 13/04* (2013.01); *F21V 13/045* (2013.01);
(Continued)

(58) Field of Classification Search
CPC ........ F21V 13/04; F21V 13/045; F21V 5/008; F21V 5/045; F21V 7/0091; F21V 7/10;
(Continued)

(56) References Cited

U.S. PATENT DOCUMENTS 6,616,299 B2 *   9/2003   Martineau ............... F21V 5/045
                                                           362/235
6,724,543 B1 *   4/2004   Chinniah ................. F21V 5/008
                                                           359/718
(Continued)

FOREIGN PATENT DOCUMENTS

DE    102010060228 A1    5/2012
DE    102011084881 A1    4/2013
(Continued)

OTHER PUBLICATIONS

Reshetin, Collimator, Aug. 8, 1990, EP0380663, English translation of disclosure (Year: 1990).*
(Continued)

*Primary Examiner* — Peggy A Neils
(74) *Attorney, Agent, or Firm* — Viering, Jentschura & Partner MBB

(57) ABSTRACT

An illumination device is provided with an optoelectronic light source and an optical body. The optical body is divided into an inner lens part and an outer reflector part adjoining thereon outward in relation to directions perpendicular to a main direction, which body parts are formed monolithically with one another. The inner part is formed as a Fresnel lens with active flanks which acts as a collimating lens, so that a first part of the light which passes through the Fresnel lens via the active flanks is refracted toward the main direction. A second part of the light which passes through the Fresnel lens via folding flanks is refracted away from the main direction. A reflection surface is provided on the outer reflector part, on which the second part of the light is incident and is reflected thereon and deflected with the reflection toward the main direction.

18 Claims, 6 Drawing Sheets

(51) Int. Cl.
*G02B 3/08* (2006.01)
*F21V 5/00* (2018.01)
*F21W 131/406* (2006.01)
*F21Y 115/10* (2016.01)

(52) U.S. Cl.
CPC ......... *G02B 3/08* (2013.01); *F21W 2131/406* (2013.01); *F21Y 2115/10* (2016.08)

(58) Field of Classification Search
CPC .. F21W 2131/406; F21Y 2115/10; G02B 3/08
See application file for complete search history.

(56) References Cited

U.S. PATENT DOCUMENTS

| | | | |
|---|---|---|---|
| 9,784,430 B2 * | 10/2017 | Shen | F21K 9/233 |
| 2004/0080835 A1 | 4/2004 | Chinniah et al. | |
| 2013/0201722 A1 | 8/2013 | Yoder et al. | |
| 2014/0239336 A1 | 8/2014 | Streppel et al. | |
| 2017/0023211 A1 * | 1/2017 | Sepkhanov | F21S 8/085 |
| 2018/0074232 A1 * | 3/2018 | Dross | F21V 7/0091 |

FOREIGN PATENT DOCUMENTS

| | | |
|---|---|---|
| DE | 202013101816 U1 | 7/2014 |
| DE | 102011003300 B4 | 1/2015 |
| EP | 0380663 A1 | 8/1990 |
| WO | 2015090706 A1 | 6/2015 |

OTHER PUBLICATIONS

German Search Report based on application No. 10 2015 216 111.0 (10 pages) dated Feb. 11, 2016 (For reference purpose only).
International Search Report based on application No. PCT/EP2016/065609 (5 pages + 2 pages English translation) dated Oct. 6, 2016 (For reference purpose only).

* cited by examiner

ILLUMINATION DEVICE

RELATED APPLICATIONS

The present application is a national stage entry according to 35 U.S.C. § 371 of PCT application No.: PCT/EP2016/065609 filed on Jul. 1, 2016, which claims priority from German application No.: 10 2015 216 111.0 filed on Aug. 24, 2015, and is incorporated herein by reference in its entirety.

TECHNICAL FIELD

The present disclosure relates to an illumination device including an optoelectronic light source and an optical body.

BACKGROUND

The advantages which optoelectronic light sources can have, for example, in relation to conventional incandescent or also phosphorescent lamps, relating to the energy efficiency and also the durability, are known. One requirement in this regard can be represented by the adaptation of the light distribution generated by the optoelectronic light source, which is typically Lambertian, to a light distribution then desired in the application.

SUMMARY

The present disclosure is based on the technical problem of specifying a particularly advantageous illumination device.

This object is achieved according to the present disclosure by an illumination device including an optoelectronic light source having a light emission surface for the emission of light and an optical body, through which the light passes, for light redistribution, on which optical body the light is incident with a main direction, wherein the optical body is divided into an inner lens part and an outer reflector part adjoining thereon outward in relation to directions perpendicular to the main direction, which optical body parts are formed monolithically with one another, wherein the inner light part is formed as a Fresnel lens, i.e., a light passage surface of the inner lens part is subdivided into active flanks and folding flanks, which Fresnel lens having the active flanks acts as a collimating lens, so that a first part of the light which passes through the Fresnel lens via the active flanks is refracted toward the main direction, wherein a second part of the light which passes through the Fresnel lens via the folding flanks is refracted away from the main direction, and wherein a reflection surface is provided on the outer reflector part, on which the second part of the light is incident and reflected thereon and deflected with the reflection toward the main direction.

Preferred embodiments are found in the dependent claims and the entire disclosure, wherein a differentiation is not always made in detail in the description between device and method and/or use aspects; the disclosure is to be read implicitly with respect to all claim categories in any case.

An initial approach of the inventor was directed to optimizing the Fresnel lens so that no light is incident on the folding flanks and thus all of the light is refracted in the desired manner by the active flanks. However, the inventor has established in this case that such an optimization is only possible in principle for a punctiform light source, but not for a light source having a light emission surface of specific dimensions. In the latter case, a part of the light is frequently also incident on the folding flanks and forms interfering light excluded from the bundling, for example, in the form of dazzling reflections.

The approach according to the present disclosure is now directed to guiding a part of the light (the "second") intentionally via the folding flanks, and thus initially away from the main direction, i.e., outward. The first part of the light guided via the active flanks, in contrast, already receives the desired shape originally, specifically it is refracted toward the main direction. In that the second part of the light is then guided via the outer reflector part and the reflection surface provided thereon, a redirection toward the main direction takes place, the second part is more or less incorporated with the reflection into a beam bundle formed by the first part of the light and is usable jointly therewith. Thus, on the one hand, a formation of interfering light is at least avoided and, on the other hand, because the second part of the light is not simply filtered out, for example, the efficiency can also be increased.

In summary, the light which passes through the inner lens part of the optical body is thus split there, wherein the second part with its luminosity distribution initially lies outside a target corridor desired by the application (in which the first part lies); it is then brought with the reflection therein, however, specifically using the outer reflector part.

The inner lens part and the outer reflector part are monolithic with one another, the optical body is advantageously a monolithic part in its entirety. "Monolithic" means free of a material boundary between different materials and/or materials of different production history in the interior, with the exception of possible randomly distributed inclusions; thus, in particular such a material limit should not extend between lens part and reflector part. In other words, an optical body material, from which the optical body is provided, is continuous without interruptions between lens part and reflector part. The "monolithic" optical body is advantageously a molded part, which is released from a mold, advantageously in its final shape. The optical body is particularly advantageously a single-component injection molded part.

The optical body material is transmissive, at least in the visible wavelength range, for example, having a transmittance averaged over this range of at least 80%, 90%, or 95%. Although the optical body can generally also be provided made of glass, the optical body material is advantageously a plastic material, such as silicone, polycarbonate, or polymethylmethacrylate.

Even if the reflection surface provided on the reflector part is not a total reflection surface, but rather, for example, is formed by a (metal) coating applied to the reflector part (which is generally possible), the optical body with the reflector part can provide at least one integral carrier for such a reflection layer. The latter will thus specify a defined position, which can help reduce manufacturing variations and therefore discards in comparison to the assembly of individual parts, for example. The proposed optical body can also help reduce the number of the individual parts to be kept ready in comparison to the provision of a separate reflector, in particular if the reflection surface is advantageously a total reflection surface.

The "main direction" is formed as a focal point direction, thus as the mean value of all directional vectors along which the light propagates, wherein each directional vector is weighted using the luminosity associated therewith in this mean value calculation. All of the light incident from the light source on the optical body having its directions of incidence is used as the basis in this case. The main direction thus computed is advantageously coincident with a light source main direction, which is computed as the focal point direction of all of the light emitted by the light source.

The refraction or redirection of light "toward the main direction" means that the beams of a correspondingly refracted/redirected beam bundle each enclose a smaller angle in absolute value with the main direction after the refraction/redirection than previously. In this case, the angle change can be greater, for example, for beams situated closer to the edge of the respective beam bundle than for central beams (and quantitative values accordingly may not be reasonably specified). In general, the deflected/redirected first or second part of the light does not have to include all of the light guided up to the respective "branching point" in this case, thus, for example, all of the light incident on the reflection surface does not have to be deflected as the second part toward the main direction. This also applies to the light already incident on the folding flanks, which does not have to be refracted in its entirety away from the main direction, and also light guided via the active flanks, respectively, which does not have to be refracted in its entirety toward the main direction. A certain loss and/or undesired reflection/refractions can also always result here because of technical conditions.

Advantageously, at least 70%, 80%, or 90% (increasingly preferred in this sequence, possible upper limits are at 99% or 95%) of the light passing through the inner lens part via the active flanks makes up the "first part" of the light and/or a corresponding percentage share of the light passing through the inner lens part via the folding flanks makes up the "second part" of the light, which is firstly refracted away from the main direction and then deflected toward it. The refraction "away from the main direction" means, similarly to the above description, that the beams of the corresponding beam bundle each enclose an angle greater in absolute value with the main direction after the refraction than before. In general, in this case the smaller of two angles enclosed with directions is always considered for this purpose.

The light separated by the Fresnel lens into the first and second parts propagates beforehand from the light emission surface of the light source to the inner lens part. It is incident on a "light entry surface" of the inner lens part, which corresponds to the entire subregion, through which light passes, of an overall, possibly also larger lateral surface of the lens part. The light exit surface, which is opposite to the light entry surface, of the inner lens part in turn corresponds to the entire subregion of a (possibly also larger) lateral surface of the lens part, through which the exiting light passes.

The light entry surface of the inner lens part is advantageously concave in its entirety (but in general can also be planar), i.e., except possibly for the active and folding flanks or another substructure (see below), thus more or less considered as a sliding average; it thus forms a cupola shape. In this case, the light entry surface in its entirety can be, for example, spherical or ellipsoidal. The light entry surface can advantageously span the light emission surface of the light source such that a plane containing the light emission surface circumferentially intersects the cupola or an edge of the cupola (to which it drops from the center) lies in this plane. In general, the light emission surface of the light source is advantageously planar or, if it is composed of multiple partial surfaces, these partial surfaces lie in a common plane, respectively.

The light exit surface of the inner lens part is advantageously convexly curved (but can in general also be planar), for example, spherical or ellipsoidal, in its entirety (see above). The active and folding flanks are advantageously provided on the light entry surface and they remain out of consideration upon the observation thereof "in its entirety"; a light mixing means is advantageously provided on the light exit surface (see below), which is then left out of consideration in the case of the shape thereof "in its entirety".

The outer reflector part adjoins on the inner lens part "on the outside", it thus extends further outward than the latter, in any case upon observation of the areas through which light passes (for example, a broad base could be formed on the inner lens part, which would then be left out of consideration). Advantageously, the entire reflection surface is arranged outside the inner lens part in relation to the directions perpendicular to the main direction. In relation to a circumference about a center axis (see below) of the optical body, the reflection surface is advantageously provided completely around the circumference. In general, for example, a reflection surface parallel to the main direction is also conceivable, but the reflection surface advantageously widens along the main direction, i.e., away from the inner lens part. Overall, the optical body can have a cup shape, wherein the inner lens part forms the bottom of the cup and the reflector part forms its side wall.

The proposed optical body can also be advantageous, for example, insofar as a relatively large optically active area (in relation to the directions perpendicular to the main direction) is then provided with the reflector part adjoining on the outside, which enables good bundling (the etendue as a product of the cross-sectional area and projected spatial angle is a conserved variable). On the other hand, if a conventional lens having a correspondingly large optically active area were provided, it would then have to be relatively thick as a whole (in the main direction), which already can be disadvantageous because of the quantity of required optical body material, particularly because during production by injection molding, for example, the cooling/curing time could be lengthened and therefore the throughput could be reduced.

Furthermore, this embodiment offers the advantage that simple manufacturing of the optical body, since it can be executed without undercut, and therefore simple manufacturing by, for example, a two-part injection mold can be performed. The partition lines of the injection mold may extend in particular perpendicularly to the main direction and/or an axis of rotational symmetry of the optical body and/or a center axis defined hereafter in this case. If the optical body is produced using a method which includes the production of the main shape of the optical body as an injection molded part, the manufacturing of the optical body and therefore of the illumination device can be performed particularly simply, since injection molding methods enable precise mass production. In this case, the essential shape of the optical body without finishing of the surfaces such as grinding or polishing is considered to be the main shape, in particular it can include a shape in which later all optically active elements are already contained, but also a shape in which they still have to be worked out at least partially in later method steps. With a corresponding surface quality of the injection mold, under certain circumstances, subsequent surface processing such as grinding and/or polishing can even be omitted or carried out significantly more rapidly. A coating of the reflector is also no longer necessary under certain circumstances, since the surface quality of the reflective surfaces can achieve a sufficient quality directly after the injection procedure and/or after a grinding and/or polishing process.

In one preferred embodiment, the first part of the light, immediately downstream of the inner lens part, thus while neglecting a light redistribution possibly still occurring later toward the illumination application, has a first luminosity distribution having a first aperture angle $\omega_1$. Similarly, the second part of the light, immediately downstream of the outer reflector part, has a second luminosity distribution having a second aperture angle $\omega_2$. The respective aperture angle $\omega_1/\omega_2$ is taken in this case over the half-width of the respective luminosity distribution, in general in each case as a mean value computed over a circumference around an axis parallel to the main direction (the aperture angle can thus be of different sizes in different directions perpendicular to the main direction). The respective aperture angle $\omega_1/\omega_2$ is advantageously constant over such a circumference, the respective beam bundle (having the first/second part of the light) is thus rotationally-symmetrical to said axis.

In a preferred embodiment, $\omega_2 \leq \omega_1$ now applies. Speaking figuratively, with the deflection, the second part of the light is brought completely into the target corridor, which the first part specifies. With the bundling via the active flanks, a (first) luminosity distribution is defined, within the angle dimensions of which the second luminosity distribution then also lies.

In one preferred embodiment, the entire first part of the light passes the reflection surface, is thus not incident thereon, but rather passes thereby. Exclusively the second part of the light is incident on the reflection surface, which can thus be optimized, for example, with respect to its shape to the second part of the light and the deflection thereof.

In one preferred embodiment, the luminosity decreases with an increasing tilt angle (angle in relation to the main direction) from a maximum value, for example, in a Gaussian manner, in the first luminosity distribution (see above). The second part of the light has, immediately downstream of the inner lens part, i.e., still before the reflector part, an intermediate luminosity distribution, in which the luminosity increases in any case over a tilt angle range (in a tilt angle interval) with increasing tilt angle. There is now a limit tilt angle or a limit tilt angle interval between the first and the intermediate luminosity distribution, below which the luminosity of the first luminosity distribution is greater than that of the intermediate luminosity distribution and above which the luminosity in the intermediate luminosity distribution is greater than that of the first luminosity distribution.

At the limit tilt angle, the luminosity in the first luminosity distribution should now advantageously only still make up at most 20%, in this sequence increasingly advantageously only at most 15%, 10%, or 5%, of the maximum value of the first luminosity distribution, and should particularly advantageously be equal to zero. The first and the intermediate luminosity distributions should thus overlap in a rather small part in any case, i.e., in other words should be cleanly separated as much as possible. The inventor has observed good glare suppression in this case, which at least reduces interfering reflections.

It can be particularly preferable, as noted, for the two distributions to not overlap at all, and there is a limit tilt angle interval having arbitrarily many limit tilt angles therein; at the limit tilt angles therein, the luminosity of the first luminosity distribution is already equal to zero and that of the intermediate luminosity distribution is still equal to zero. Such an interval can extend, for example, over at least 3°, advantageously at least 5°, and (independently thereof), for example, at most 45°, 40°, 35°, 30°, 25° or 20° (increasingly preferred in the sequence mentioned).

The described curve of the luminosity in the first and the intermediate luminosity distributions should generally apply in at least two sectional planes, which are perpendicular to one another and each contain the center axis (see below) of the optical body, advantageously in all sectional planes containing the center axis, i.e., completely circumferentially. The limit tilt angle or a limit tilt angle interval is, for example, at tilt angles of, increasingly advantageously in this sequence, at most 65°, 60°, 55°, 50°, 45°, or 40°; possible lower limits are (independently thereof), for example, at least 5°, advantageously at least 10°, more advantageously at least 15°, particularly advantageously at least 20°. The limit tilt angle interval should be completely in a corresponding range in this case, wherein range and interval limits can be coincident. In the intermediate luminosity distribution, the luminosity is advantageously equal to zero at tilt angles up to at least 30°, particularly advantageously up to at least 35°.

The first and the second part of the light can be in a ratio (first part:second part) in relation to one another, for example, of at least 1:10, 1:5, or 3:10, wherein possible upper limits (independently thereof) can be, for example, at most 10:1, 9:1, or 8:1, each increasingly advantageously in the sequence they are mentioned. Without express specification to the contrary (for example, as above in case of the luminosity), statements in the scope of this disclosure relate to ratios or fractions of light on the luminous flux.

In one preferred embodiment, the Fresnel lens has a light-source-side focal point, which is spaced apart by at most 5 mm from the light emission surface, in this sequence increasingly advantageously at most 4 mm, 3 mm, 2 mm, or 1 mm. The smallest spacing which the focal point has to the light emission surface is considered in this case. All beams do not necessarily have to intersect in the focal point in this case (also because of technical requirements), but rather the light can also be widened somewhat in a focus spot around the focal point, wherein the spot diameter is, for example, not to be greater than 2 mm, 1 mm, or 0.5 mm (increasingly advantageously in the sequence mentioned); the diameter is generally taken as the mean value of smallest and largest extension and corresponds in the preferred case of the circular shape to the circle diameter. The focal point is where the beam bundle cross section is minimal, and is thus punctiform in the idealized consideration.

It can be preferable, on the one hand, for the focal point to be in the light emission surface. On the other hand, however, a certain defocusing can also be of interest, for example, to avoid imaging of the light emission surface, which possibly interferes in the illumination, for example. The focal point can thus in this case be spaced apart by, for example, at least 1 mm, advantageously at least 2 mm, from the light emission surface (possible upper limits see above).

In one preferred embodiment, a first of the active flanks has a first light-source-side active flank focal point and a second of the active flanks has a second light-source-side active flank focal point, wherein these two focal points are spaced apart by at least 1 mm in relation to one another in the main direction, increasingly advantageously in the sequence mentioned at least 2 mm, 3 mm, 4 mm, or 5 mm. Possible upper limits can be, for example, (independently thereof) at most 10 mm, 8 mm, or 6 mm. The active flanks are thus intentionally designed so that they do not have a common focal point, but rather there is more or less a focal region spread out in the main direction. This can, for example, in turn offer advantages with respect to avoiding exact imaging of the light emission surface.

It can be preferable for the respective active flank focal points of all active flanks to each be spaced apart somewhat in relation to one another, wherein the first and the second active flank focal point advantageously span an interval on which the remaining active flank focal points are distributed. A respective active flank focal point lies in each case, similarly to the above description, where the beam bundle cross section of a beam bundle guided via the respective active flank is minimal, it thus has its active flank focused spot.

In one preferred embodiment, the folding flanks extend in parallel to one another, and specifically, observed in a sectional plane containing the center axis of the optical body, each of those folding flanks which lie on the same side of the center axis. This advantageously applies to all such sectional planes, i.e., completely circumferentially. It can be preferable for the folding flanks to lie parallel to the center axis, i.e., the folding flanks arranged on various sides of the center axis are thus also parallel to one another.

The "center axis" is advantageously an axis in relation to which the inner lens part (the part thereof through which light passes) is at least rotary symmetrical, advantageously rotationally symmetrical. The optical body is advantageously rotary symmetrical in relation to the center axis, in any case with its regions through which light passes. The center axis advantageously lies parallel to the main direction.

This embodiment also offers the advantage of a simple manufacturing without undercut of the optical body.

In general, the folding flanks, even if they are arranged on the same side of the center axis, can also be tilted in relation to one another, however. In this case, it can be preferable for the tilt of the folding flanks to decrease in a direction parallel to the center axis and pointing in the direction of the main direction with increasing distance from the center axis. The folding flanks also advantageously each extend linearly per se observed in said sectional planes.

Depending on the tilt angle of the folding flanks, an undercut-free shape is also provided here.

In a preferred embodiment, the second part of the light enters the outer reflector part at an inner surface thereof, and an outer surface, which is opposite to the inner surface, of the outer reflector part forms the reflection surface, wherein the deflection advantageously takes place by total reflection. "Inner" and "outer" relate in this case to the directions perpendicular to the main direction and/or to the center axis of the lens. The second part of the light thus exits at the light exit surface of the inner lens part, passes through a gas volume, typically air, and then enters the optical body again at the inner surface, also into the outer reflector part; after the reflection, the second part of the light then propagates again toward the inner surface of the outer reflector part, to exit there.

In one preferred embodiment, the outer surface of the outer reflector part is formed having a plurality of oblong prism protrusions, in each of which the respective incident light is deflected by twofold total reflection toward the main direction. For this purpose, each of the prism protrusions has two flanks tapering toward one another in a wedge shape in a respective ridge outward (in relation to directions perpendicular to the main direction/center axis). A light beam which is incident within an acceptance spatial angle range on a respective reflection prism is then totally reflected once on each of the two flanks and thus deflected as a result. The flanks can each be planar or, for example, also slightly convexly curved when observed in sectional planes perpendicular to the respective ridge.

In this manner, in each case a "majority" of the light incident on a respective reflection prism is deflected, for example, at least 70%, 80%, or 90%, advantageously all of the light (in the scope of the technically possible). In each prism protrusion, the two flanks enclose a wedge angle of at least 60°, 65°, 70°, 75°, 80°, or 85° with one another, wherein (independently thereof) advantageous upper limits are at most 120°, 115°, 110°, 105°, 100°, or 95°, in each case increasingly advantageously in the sequence mentioned.

In one preferred embodiment, the prism protrusions are each provided and arranged such that the respective ridge lies completely in a plane containing the center axis of the optical body. The ridges advantageously each extend over the entire length thereof as a straight line; all ridges are advantageously arranged on the same lateral surface of a truncated cone (the lateral surface widens away from the inner lens part).

In general, the ridges and therefore the effective reflection surface observed in the sectional planes containing the center axis can also have other shapes, however, for example, circular (as a circular arc) or can also be aspherical, for example, parabolic, elliptical, or also entirely freely formed. They can bulge in this case toward the center axis (wherein the outer surface would be concave) or can extend with a bulge away therefrom (wherein the outer surface would be convex).

In one preferred embodiment, the inner surface of the outer reflector part is faceted at least in regions, advantageously in the entire region through which the second part of the light radiates, particularly advantageously in its entirety. In general, moreover the outer surface could also (solely or additionally) be faceted, could thus extend, for example, in a curved ridge like a polygon train. The advantageously faceted inner surface is subdivided into partial surfaces (the facets), wherein the closest adjacent of the partial surfaces then always adjoin one another at an angle. In general, the facets can also be concave and/or convex, they are advantageously each planar per se. A faceting can be performed with respect to a circumference around the center axis and/or in sectional planes containing the center axis, advantageously both at the same time.

The inner surface of the outer reflector part can be subdivided, for example, into at least 50, advantageously at least 100, particularly advantageously at least 150 facets. Possible upper limits can be (independently thereof), for example, at most 1000 or 500.

In one preferred embodiment, the light entry surface of the inner lens part is the light passage surface subdivided into active and folding flanks, the Fresnel structure is thus provided on the entry side of the inner lens part.

In one preferred embodiment, the light exit surface, which is opposite to the light entry surface, of the inner lens part is provided with a light mixing means; this widens the cross section of a beam bundle passing through the light exit surface and can thus help mix light originating from different points of the light emission surface. In general, a separate coating can also be provided on the light exit surface as the light mixing means, for example, the light exit surface itself advantageously forms the light mixing means, for example, by surface roughening.

In one preferred embodiment, microlenses molded into the light exit surface form the light mixing means. A beam bundle which passes through the light exit surface is subdivided by the microlenses into a plurality of partial beam bundles (one partial beam bundle per microlens). In this case, each partial beam bundle is widened somewhat downstream of the respective microlens (downstream of the focal plane in the case of collimating lenses), for example, by at least 2°, advantageously at least 5°, wherein (independently thereof) possible upper limits are at most, for example, 20°, 15°, or 10° (increasingly advantageously in the sequence mentioned). For the widening, the aperture angle (see above) of the respective partial beam bundle of the respective microlens is compared upstream and downstream with respect to the absolute value.

As a result of the widening, the partial beam bundles are then superimposed and homogenization of the light is thus achieved. In general, a microlens can also be formed as a scattering lens, the light exit surface can thus be locally convexly curved in the region of the respective microlens. However, the inventor has established that this can promote the tendency for total reflections at the light exit surface. A microlens is therefore advantageously designed as a collimating lens, the light exit surface is thus locally convexly curved there. This particularly advantageously applies to all microlenses of the light exit surface.

At least 20, advantageously at least 50, particularly advantageously at least 100 microlenses can be molded into the light exit surface, for example; possible upper limits can be (independently thereof), for example, at most 100 000, 10 000, or 1000 microlenses. A locally spherical shape is preferred for the light exit surface in the region of a respective microlens (microlens light exit surface), although in general aspherical shapes are also possible, for example, a conical, paraboloid, hyperboloid, or freely-formed shape. In general, the microlenses can also differ at least in groups in the respective radius of curvature thereof of the respective microlens light exit surface; advantageously all microlenses molded into the light exit surface have the same radius of curvature.

With respect to a distribution of the microlenses over the light exit surface, a regular, rotary-symmetrical arrangement with respect to the center axis of the optical body, for example, is generally also possible. A Cartesian network can also be laid over the light exit surface, for example, or the microlenses can be arranged in the manner of a closest hexagonal ball packing. A nonperiodic arrangement is preferred, such as a spiral arrangement, advantageously following a Fibonacci pattern.

The present disclosure also relates to the use of a presently disclosed illumination device for illumination, advantageously for stage and/or scene illumination, thus, for example, in the field of film, television, or theater, but also, for example, in large-scale productions such as concerts. The illumination device according to the present disclosure can offer advantages in this case insofar as using the functionally two-part optical body, a part reduced in weight in comparison to a conventional lens may be formed (see above), which offers advantages in particular in the case of a suspended installation (one preferred use also explicitly relates to such an installation).

However, the illumination device can also be used for general illumination, in particular in the field of building illumination, advantageously for interior illumination, for example, in the case of so-called spotlights and/or downlights.

BRIEF DESCRIPTION OF THE DRAWINGS

The present disclosure will be explained in greater detail hereafter on the basis of an exemplary embodiment, wherein the individual features can also be essential to the present disclosure in other combinations in the scope of the concurrent claims and furthermore a differentiation is also not made in detail between the different claim categories.

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
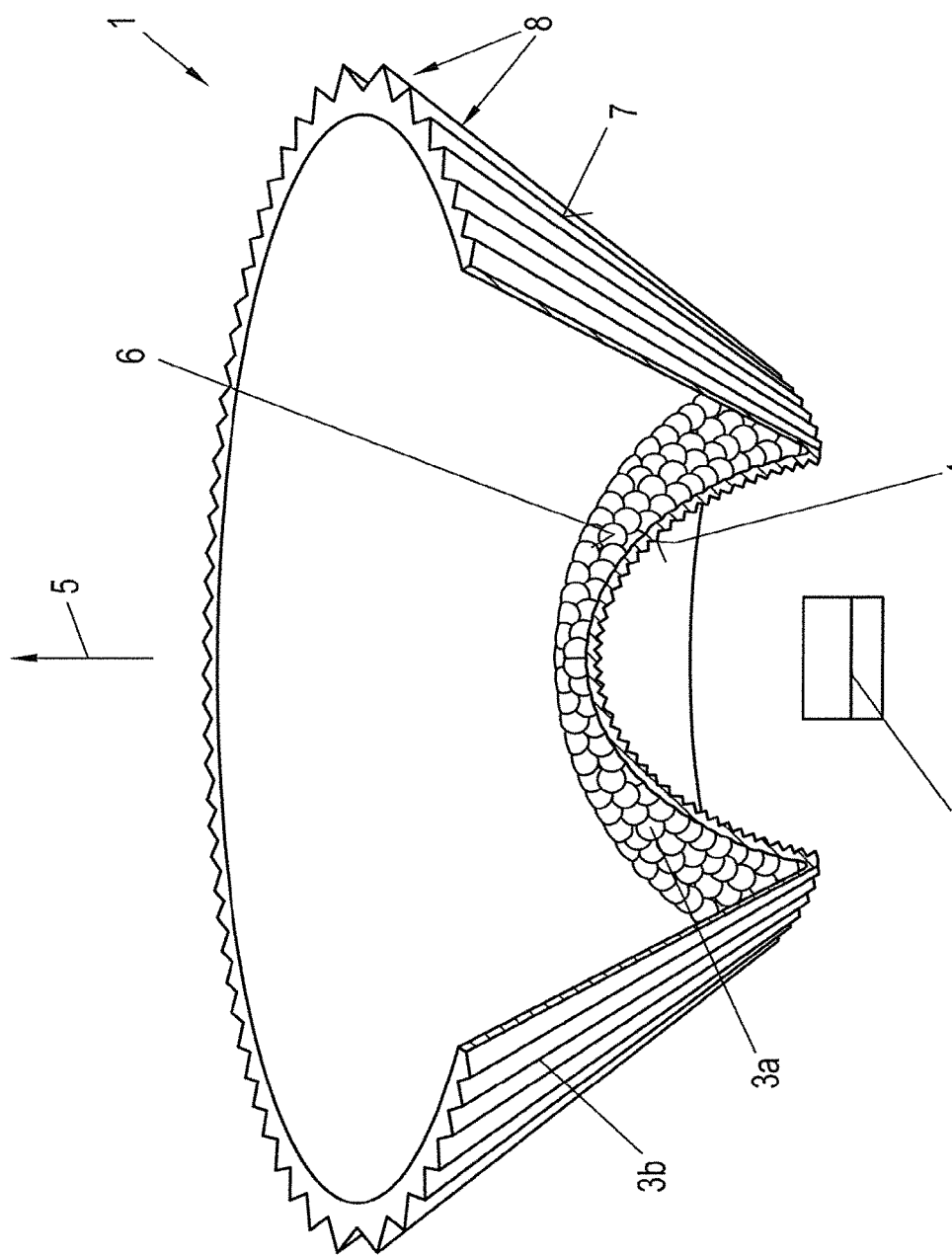
FIG. 1 shows an illumination device according to the present disclosure in an inclined view in partial section.

FIG. 1 shows an illumination device 1 according to the present disclosure including an LED 2 and an optical body 3 through which the LED radiates. The optical body 3 is divided into an inner lens part 3a and an outer reflector part 3b, which is monolithic therewith and is produced in the same injection molding step.

Figure 2:
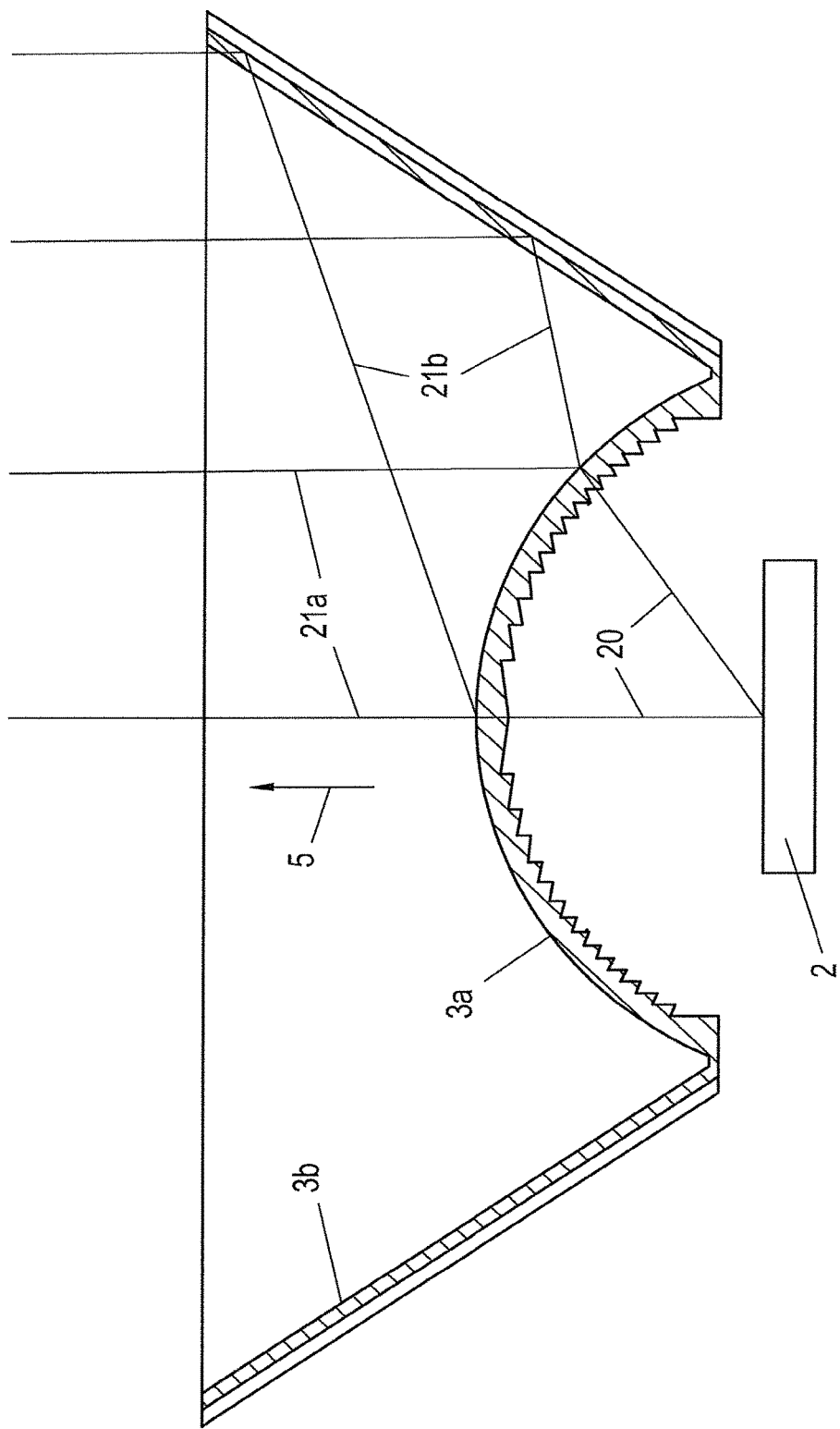
FIG. 2 shows a schematic side view of the beam guiding in the illumination device according to FIG. 1.
Figure 3:
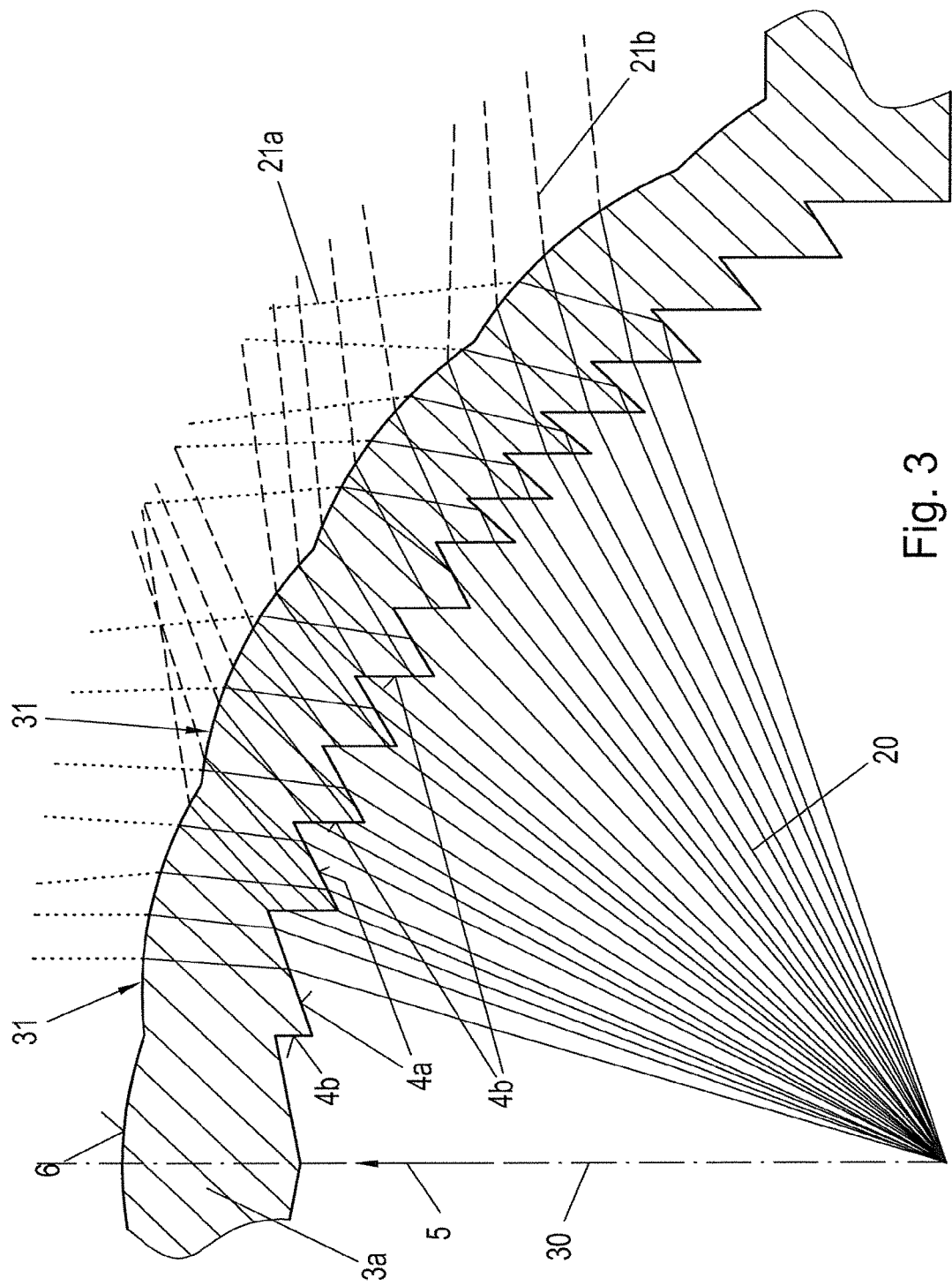
FIG. 3 shows the inner lens part of the optical body of the illumination device according to FIG. 1 in a section having an exemplary beam bundle.

The light emitted by the LED 2 is incident on the light entry surface 4 of the inner lens part 3a, which is subdivided as a Fresnel structure into active flanks 4a and folding flanks 4b (cf. FIG. 3 in detail). A first part of the light is incident on the active flanks 4a and is refracted in this case toward the main direction 5, i.e., bundled. A second part of the light is incident on the folding flanks 4b and is refracted away from the main direction 5, cf. also the schematic illustration in FIG. 2.

Figure 4:
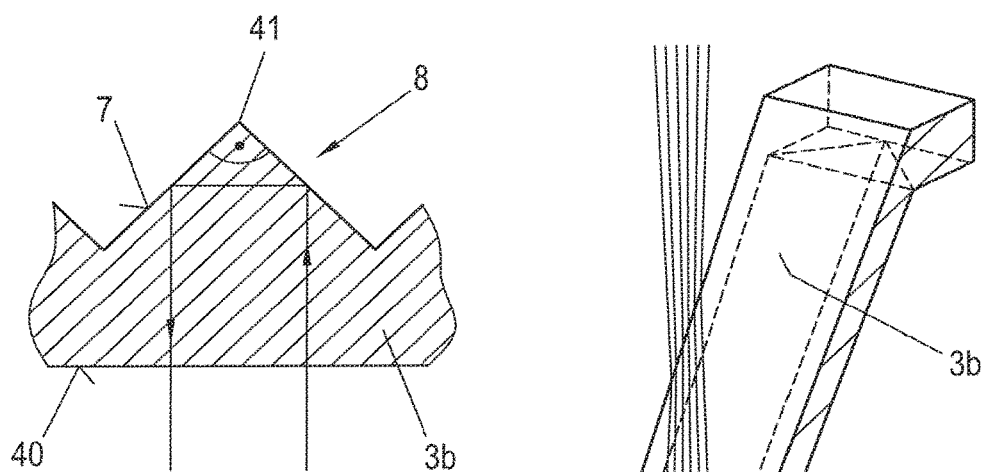
FIG. 4A shows a detail of the outer reflector part of the optical body of the illumination device according to FIG. 1 having a reflection prism and a beam bundle totally reflected twice thereon.
FIG. 4B shows a schematic illustration to illustrate the twofold total reflection according to FIG. 4A.
Figure 4:
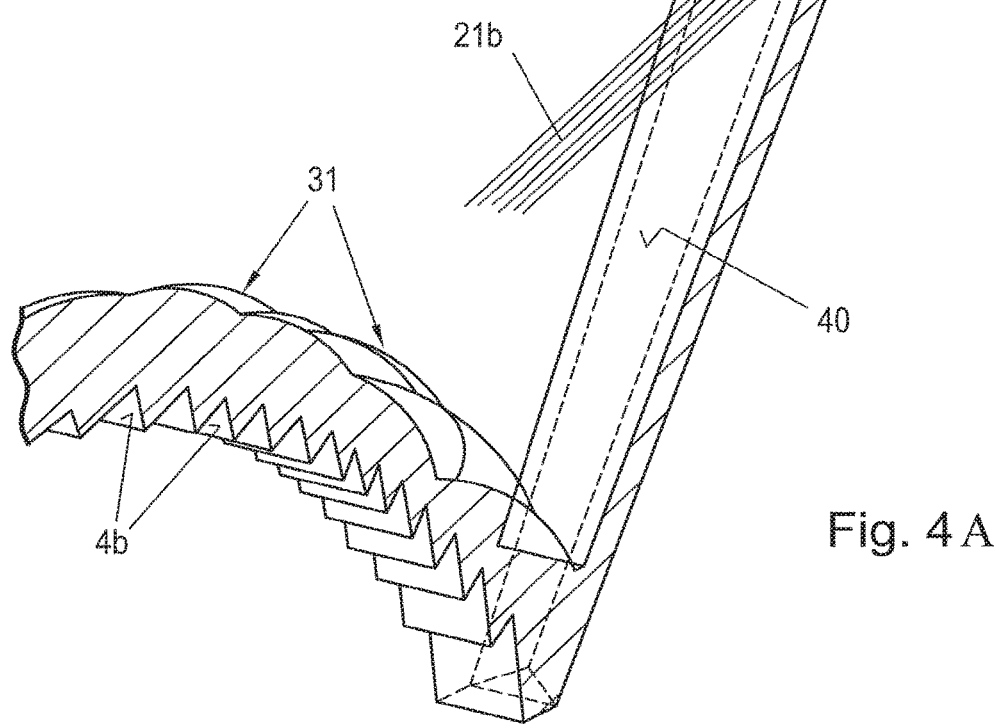

The first part of the light refracted toward the main direction 5 exits at a light exit surface 6, which is opposite to the light entry surface 4, of the inner lens part 3a and is directly available as useful light in this form. To now also make the second part of the light refracted away from the main direction 5 usable, after the exit at the light exit surface 6, it is guided via the outer reflector part 3b and deflected thereon at an outer surface 7 by total reflection. For this purpose, a plurality of respectively oblong reflection prisms 8 are molded into the outer surface 7, the deflection thus takes place in each case by twofold total reflection, cf. FIG. 4 in detail.

As a result, the second part of the light guided via the folding flanks 4b is thus brought similarly into the target corridor specified by the first part of the light guided via the active flanks 4a. The aperture angle of the luminosity distribution of the second part of the light corresponds downstream from the outer reflector part 3b to the aperture angle of the first part of the light downstream of the inner lens part 3a.

FIG. 2 illustrates this beam guiding once again schematically. A beam bundle 20, which reproduces a part of the light emitted by the LED 2 in its entirety, is incident on the inner lens part 3a and is split by the Fresnel structure into a first part 21a and a second part 21b. The second part 21b is then reflected at the outer reflector part 3b and thus bundled in the same manner as the first part 21a.

FIG. 3 shows the inner lens part 3*a* in a sectional plane containing a center axis 30 of the optical body 3. Firstly, the Fresnel structure, i.e., the subdivision of the light entry surface 4 into the active flanks 4*a* and the folding flanks 4*b*, can be recognized here in detail. A beam bundle 20 is shown by way of example, which, insofar as it is incident on the active flanks 4*a*, is refracted as the first part 21*a* of the light toward the main direction 5. Insofar as the beam bundle 20 is incident on the folding flanks 4*b*, it is refracted as the second part 21*b* of the light away from the main direction 5.

Figure 6:
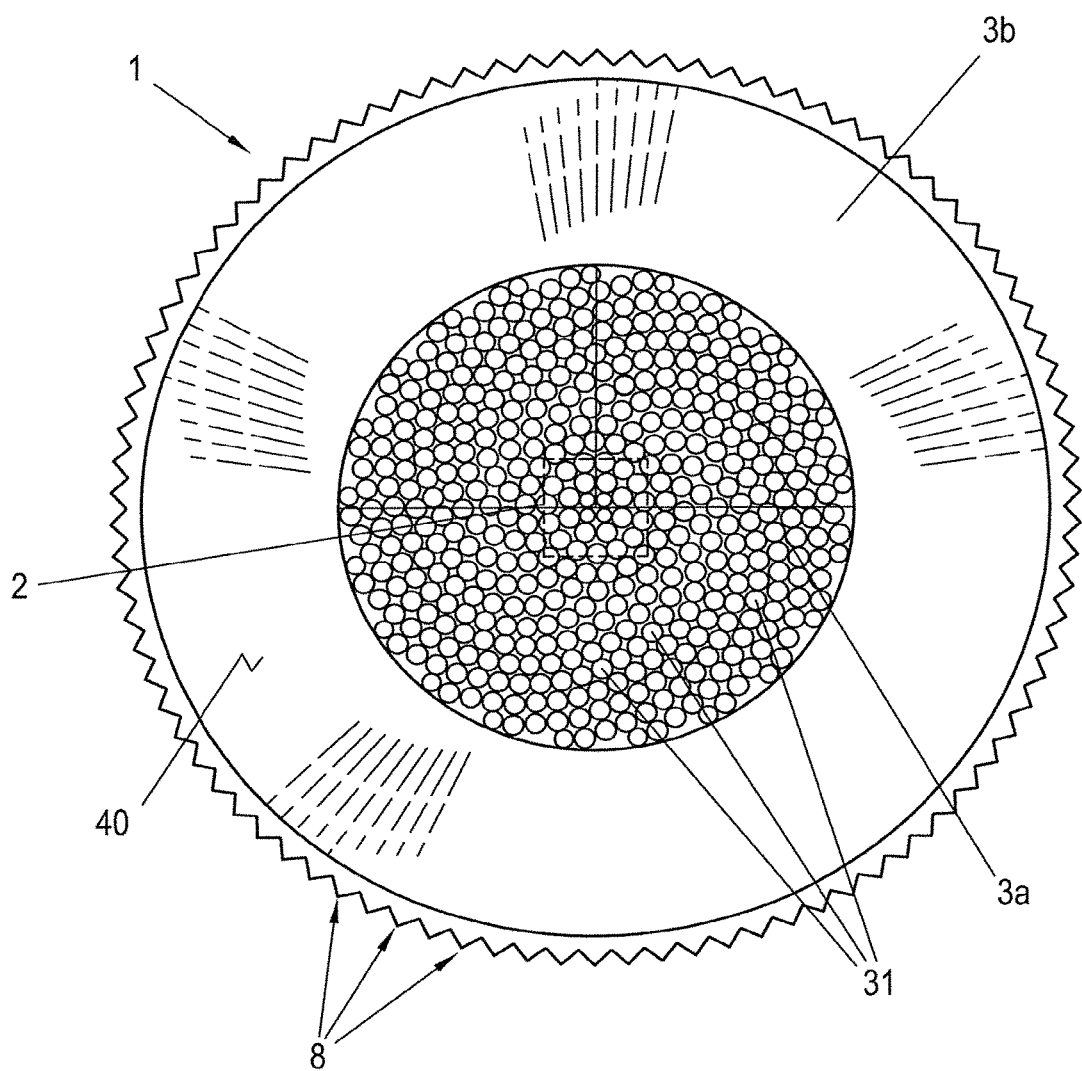
FIG. 6 shows the illumination device according to FIG. 1 in a top view, looking thereon opposite to the main direction.

It can furthermore be seen in FIG. 3 that the light exit surface 6 of the inner lens part 3*a* is subdivided into a plurality of microlenses 31. These each act as a collimating lens, and thus bundle a respective partial beam bundle passing through the respective microlens 31, so that it is then fanned out downstream of the respective focal plane. As a result, each one of the partial beam bundles guided via a respective microlens 30 is somewhat widened and the light is thus mixed. FIG. 6 illustrates the microlenses 30 and the arrangement thereof in a top view.

FIG. 4A illustrates in a detail how the second part 21*b* of the light is deflected at the outer reflector part 3*b*. The beam bundle shown by way of example enters the outer reflector part 3*b* at an inner surface 40 and is totally reflected twice at the opposing outer surface 7 and thus deflected toward the main direction 5. For this purpose, the reflection prisms 8 are molded into the outer surface 7, of which the detail shown in FIG. 4A contains one and thus represents a main body of the rotary-symmetrical structure.

FIG. 4B illustrates the functionality of the reflection prism 8 schematically, i.e., in simplified form (actually incoming and outgoing beams do not lie in one plane; moreover, in the ideal case, in the event of a point source, the outgoing beam would also be returned back into the origin of the incoming beam). The reflection prism 8 is formed from two flanks which are molded into the outer surface 7 and taper toward one another in a ridge 41 and an angle of somewhat greater than 90°. The light entering into the outer reflector part 3*b* at the inner surface 40 is totally reflected once at the first flank and a second time at the second flank and thus deflected as a result. The schematic section according to FIG. 4B is in a plane perpendicular to the main direction 5.

The inventor has determined that the second part 21*b* of the light may be brought particularly well into the target corridor specified by the first part 21*a* using the outer reflector part 3*b* if the first and the second parts 21*a*, *b* are cleanly separated at the Fresnel structure.

Figure 5:
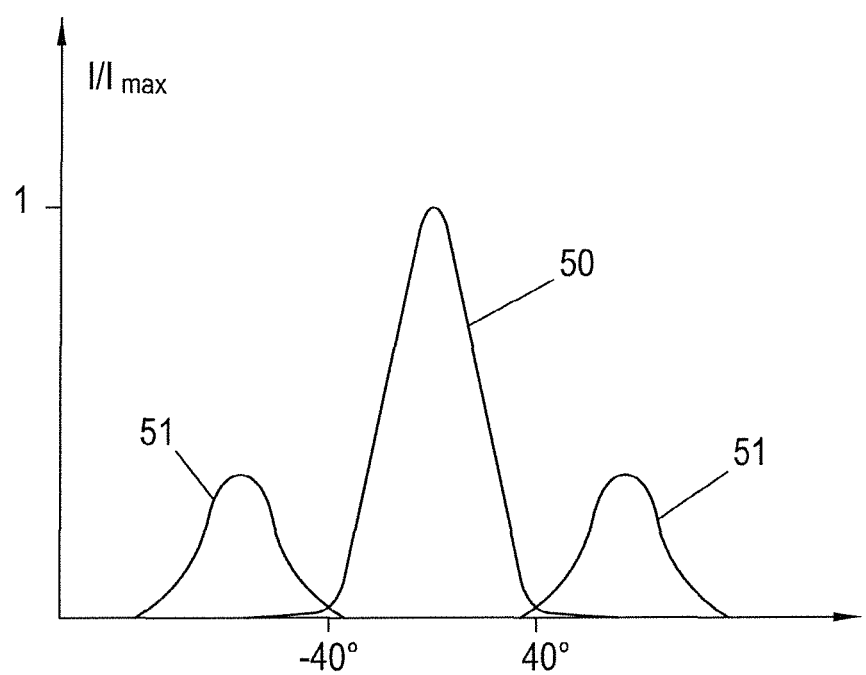
FIG. 5 shows a diagram to illustrate the luminosity distribution immediately downstream of the inner lens part.

FIG. 5 shows two luminosity distributions, namely, on the one hand, a first luminosity distribution 50, which the first part 21*a* of the light has immediately downstream of the inner lens part 3*a*. On the other hand, an intermediate luminosity distribution 51 is shown, which the second part 21*b* of the light has immediately downstream of the inner lens part 3*a*, i.e., still upstream of the outer reflector part 3*b*.

The first luminosity distribution 50 extends in a Gaussian manner around a central maximum value (to which the Y axis is scaled), while in contrast the luminosity first increases and then decreases again further outward in the intermediate luminosity distribution 51, more or less lies in a ring shape around the first luminosity distribution 50. The tilt angle in relation to the main direction 5 is plotted on the Y axis, and at tilt angles greater than a limit tilt angle of 40°, the luminosity in the intermediate luminosity distribution 51 is then greater than in the first luminosity distribution 50.

At this limit tilt angle, in this case the intensity in the first luminosity distribution 50 has already dropped significantly, it only still makes up approximately 5% of the maximum. In that the first and the second part of the light are clearly separated in this form, exclusively the second part 21*b* of the light can then be deflected using the downstream outer reflector part 3*b*, the first part 21*a* of the light is thus not also influenced in an undesired manner in this case. In the present case, an overlap between first luminosity distribution 50 and intermediate luminosity distribution 51 is also shown for illustration purposes, moreover, this can advantageously be so that the two no longer overlap at all and there is a limit tilt angle interval between them.

FIG. 6 shows the illumination device 1 in a top view, looking thereon opposite to the main direction 5. The view thus falls on the light exit surface 6 of the inner lens part 3*a* and the inner wall surface 40 of the outer reflector part 3*b*. In this case, primarily the subdivision of the light exit surface 6 into the microlenses 40 can be seen, which are arranged in the form of a Fibonacci pattern. For illustrative reasons, the complete area is not occupied with microlenses 40 here, which is preferable in practice, however (like a closest ball packing).

The inner wall surface 40 of the outer reflector part 3*b* is faceted (not shown in detail), and specifically divided into partial surfaces which are each planar per se. Furthermore, the upper ends of the reflection prisms 8 in relation to the main direction 5 can be seen in the top view.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. An illumination device comprising
   an optoelectronic light source having a light emission surface for the emission of light and an optical body, through which the light passes, for light redistribution, on which optical body the light is incident with a main direction,
   wherein the optical body is divided into an inner lens part and an outer reflector part adjoining thereon outward in relation to directions perpendicular to the main direction, which optical body parts are formed monolithically with one another,
   wherein the inner lens part is configured as a Fresnel lens, so that a light passage surface of the inner lens part is subdivided into active flanks and folding flanks, which Fresnel lens having the active flanks acts as a collimating lens, so that a first part of the light which passes through the Fresnel lens via the active flanks is refracted toward the main direction, wherein a second part of the light which passes through the Fresnel lens via the folding flanks is refracted away from the main direction, in which the folding flanks, observed in sectional planes which each contain a center axis of the optical body, extend substantially parallel to one another, insofar as they lie on the same side of the center axis, and wherein a reflection surface is provided on the outer reflector part, on which the second part of the light is incident and is reflected thereon and deflected with the reflection toward the main direction.

2. The illumination device as claimed in claim 1, in which the first part of the light, immediately downstream of the inner lens part, has a first luminosity distribution having a first aperture angle $\omega_1$ and the second part of the light, immediately downstream of the outer reflector part, has a second luminosity distribution having a second aperture angle $\omega_2$, wherein $\omega_2 \leq \omega_1$.

3. The illumination device as claimed in claim 1, in which the entire first part of the light passes the reflection surface, so that the light passes thereby.

4. The illumination device as claimed in claim 1, in which the first part of the light, immediately downstream of the inner lens part, has a first luminosity distribution, in which the luminosity decreases from a maximum value with an increasing tilt angle in relation to the main direction, wherein the second part of the light, immediately downstream of the inner lens part, has an intermediate luminosity distribution, in which the luminosity increases at least in some regions with increasing tilt angle, wherein at tilt angles below a limit tilt angle, the luminosity in the intermediate luminosity distribution is less than the luminosity in the first luminosity distribution, at which limit tilt angle the luminosity in the first luminosity distribution only still makes up at most 20% of the maximum value.

5. The illumination device as claimed in claim 1, in which the Fresnel lens acting as a collimating lens has a light-source-side focal point, which is spaced apart by at most 5 mm from the light emission surface.

6. The illumination device as claimed in claim 1, in which a first of the active flanks has a first light-source-side active flank focal point and a second of the active flanks has a second light-source-side active flank focal point, wherein these two active flank focal points are spaced apart by at least 1 mm in relation to one another in the main direction.

7. The illumination device as claimed in claim 1, in which the second part of the light enters therein at an inner surface of the outer reflector part and the reflection surface is arranged on an outer surface, which is opposite to the inner surface, of the outer reflector part.

8. The illumination device as claimed in claim 7, in which the outer surface of the outer reflector part forms a total reflection surface and is molded for this purpose having a plurality of oblong prism protrusions, each of which has two flanks, which taper toward one another outward into a respective ridge for each prism protrusion and enclose there a respective wedge angle of at least 60° and at most 120° in each case with one another, so that each of the prism protrusions forms a reflection prism, at which at least the majority of the respective part incident thereon of the second part of the light is deflected by twofold total reflection toward the main direction.

9. The illumination device as claimed in claim 8, in which each of the prism protrusions is provided and arranged such that the ridge thereof lies completely in a respective plane containing a center axis of the optical body.

10. The illumination device as claimed in claim 7, in which the inner surface of the outer reflector part is faceted at least in regions.

11. The illumination device as claimed in claim 1, in which a light entry surface, at which the light enters the inner lens part, is the light passage surface subdivided into the active flanks and the folding flanks.

12. The illumination device as claimed in claim 11, in which a light exit surface, which is opposite to the light entry surface, of the inner lens part is provided with a light mixing means.

13. The illumination device as claimed in claim 12, in which the light mixing means is a microlens arrangement having a plurality of microlenses molded into the light exit surface.

14. A method for producing an illumination device, the method comprising:
providing an optoelectronic light source having a light emission surface for the emission of light;
producing an optical body, through which the light passes, for light redistribution, on which optical body the light is incident with a main direction, wherein the optical body is produced by injection molding, wherein the optical body is divided into an inner lens part and an outer reflector part adjoining thereon outward in relation to directions perpendicular to the main direction, which optical body parts are formed monolithically with one another, wherein the inner lens part is configured as a Fresnel lens, so that a light passage surface of the inner lens part is subdivided into active flanks and folding flanks, which Fresnel lens having the active flanks acts as a collimating lens, so that a first part of the light which passes through the Fresnel lens via the active flanks is refracted toward the main direction, wherein a second part of the light which passes through the Fresnel lens via the folding flanks is refracted away from the main direction, in which the folding flanks, observed in sectional planes which each contain a center axis of the optical body, extend substantially parallel to one another, insofar as they lie on the same side of the center axis, and wherein a reflection surface is provided on the outer reflector part, on which the second part of the light is incident and is reflected thereon and deflected with the reflection toward the main direction.

15. The illumination device as claimed in claim 1, in which the second part of the light enters therein at an inner surface of the outer reflector part and the reflection surface is arranged on an outer surface, which is opposite to the inner surface, of the outer reflector part as a total reflection surface.

16. A method for producing an illumination device as claimed in claim 14, wherein of the optical body is produced by the injection molding uses a two-part injection mold.

17. An illumination device comprising
an optoelectronic light source having a light emission surface for the emission of light and an optical body, through which the light passes, for light redistribution, on which optical body the light is incident with a main direction,
wherein the optical body is divided into an inner lens part and an outer reflector part adjoining thereon outward in relation to directions perpendicular to the main direction, which optical body parts are formed monolithically with one another,
wherein the inner lens part is configured as a Fresnel lens, so that a light passage surface of the inner lens part is subdivided into active flanks and folding flanks, which Fresnel lens having the active flanks acts as a collimating lens, so that a first part of the light which passes through the Fresnel lens via the active flanks is refracted toward the main direction, wherein a second part of the light which passes through the Fresnel lens via the folding flanks is refracted away from the main direction, and wherein a reflection surface is provided on the outer reflector part, on which the second part of the light is incident and is reflected thereon and deflected with the reflection toward the main direction,
in which the second part of the light enters therein at an inner surface of the outer reflector part and the reflection surface is arranged on an outer surface, which is opposite to the inner surface, of the outer reflector part, in which the outer surface of the outer reflector part forms a total reflection surface and is molded to comprise a plurality of oblong prism protrusions, each of which has two flanks, which taper toward one another outward into a respective ridge for each prism protrusion and enclose there a respective wedge angle of at least 60° and at most 120° in each case with one another, so that each of the prism protrusions forms a reflection prism, at which at least the majority of the respective part incident thereon of the second part of the light is deflected by twofold total reflection toward the main direction.

18. The illumination device as claimed in claim 8, in which each of the prism protrusions is provided and arranged such that the ridge thereof lies completely in a respective plane containing a center axis of the optical body.

* * * * *